Figure 1:
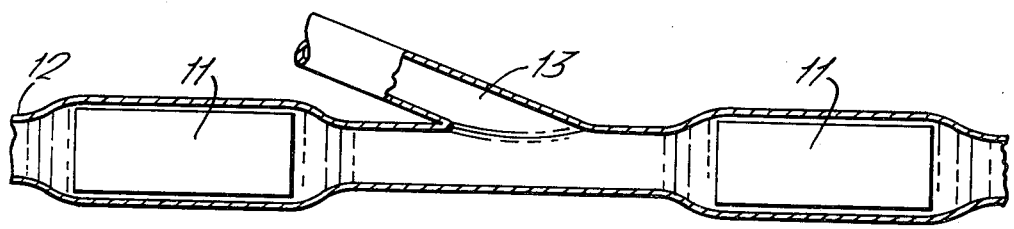

United States Patent [19]

Cairns et al.

[11] 3,957,692

[45] May 18, 1976

[54] METHOD OF PREPARING A CATALYST

[75] Inventors: James Anthony Cairns, Wantage; Michael Joseph Holdoway; Robert Livingston Nelson, both of Abingdon; Richard Stuart Nelson, Goring-on-Thames, all of England

[73] Assignee: United Kingdom Atomic Energy Authority, London, England

[22] Filed: Dec. 3, 1974

[21] Appl. No.: 529,244

[30] Foreign Application Priority Data
Dec. 10, 1973 United Kingdom............... 57208/73

[52] U.S. Cl.............................. 252/465; 252/463; 252/466 B; 252/466 J; 252/477 R; 423/213.2; 423/213.5
[51] Int. Cl.²..................... B01J 21/04; B01J 23/64; B01J 23/84
[58] Field of Search................ 252/477 R, 463, 465, 252/466 J, 466 T, 466 B; 427/383, 392; 204/192; 423/213.2, 213.5

[56] References Cited
UNITED STATES PATENTS

| | | | |
|---|---|---|---|
| 3,437,605 | 4/1969 | Keith................. | 252/477 R |
| 3,773,894 | 11/1973 | Bernstein et al................ | 252/474 X |
| 3,785,998 | 1/1974 | Hoekstra........................ | 252/477 R |
| 3,839,224 | 10/1974 | Yonehara et al. .............. | 252/477 R |

*Primary Examiner*—W. J. Shine
*Attorney, Agent, or Firm*—Larson, Taylor and Hinds

[57] ABSTRACT

A catalyst suitable, for example, for treatment of cat exhaust emissions is prepared by providing a substrate with a continuous adherent, surface layer of a carrier material for catalytic material by providing on the substrate a layer of carrier material, at least part of which comprises a gel, and firing; and sputtering catalytic material onto the surface layer by bombarding a source of the catalytic material in the neighbourhood of the surface layer with energetic ions, the conditions of atmosphere and selectivity of ions permitted to bombard the catalytic material being such that co-deposition upon the surface layer of unwanted material is avoided.

19 Claims, 1 Drawing Figure

U.S. Patent May 18, 1976 3,957,692

METHOD OF PREPARING A CATALYST

This invention relates to catalysts and their preparation.

In the specification of our U.S. application Ser. No. 375,774 filed July 2, 1973, (now abandoned) we have described inter alia, a method for use in the manufacture of a catalyst, which method comprises sputtering a material which is catalytic, or which is a component of a catalytic system, onto a substrate by bombarding a source of the material in the neighbourhood of the substrate with energetic ions, the conditions of atmosphere and selectivity of ions permitted to bombard the material being such that co-deposition upon the substrate of unwanted material is avoided.

The catalytic material is deposited in a highly active form, substantially as an atomic dispersion and under such controllable conditions that the deposition of redundant material in any part of the area over which the material is dispersed can be avoided or significantly reduced in comparison with conventional deposition. Consequently, a small exposed surface area of the substrate coated with catalytic material is capable of exhibiting a performance equivalent to a much larger exposed surface area of a substrate coated with catalytic material in a conventional manner. In this respect, it may be observed that deposition of redundant material can diminish the activity of the resultant catalyst by forming inactive "clumps" of material.

The above mentioned specification further describes a specific method in which platinum is deposited onto a porous alumina substrate by ion beam sputtering.

There is a wide range of applications for catalysts such as may be manufactured by the method described in the above mentioned specification. Some examples of such applications, are in hydrogenation reactions, gas burners, isomerisation, treatment of gaseous effluents, car exhaust treatment, and ignition devices.

In considering some of these applications, it is apparent that the substrate can play an important part in optimising the performance of the catalytic system. A particular problem, for example, is the need for car exhaust treatment systems to withstand a severe environment and repeated thermal cycling throughout the operating lifetime of the system.

We have now found that a certain support for catalytic material is particularly suitable in enabling the catalyst to meet specialised operating criteria, such as, a severe environment and thermal cycling.

Thus, the present invention provides a method of preparing a catalyst which comprises the steps of
  i. providing a substrate with a continuous, adherent surface layer of a carrier material for catalytic material by providing on the substrate a layer of carrier material, at least part of which comprises a gel, and firing, and
  ii. driving at the surface layer a substantially atomic dispersion of catalytic material, to attach onto the surface layer without agglomeration a major proportion of the atoms of the catalytic material impinging thereon.

Preferably, the attachment of the catalytic material is continued to provide an essentially monatomic dispersion of the catalytic material upon the surface layer.

The present invention further provides a method of preparing a catalyst which comprises the steps of i. providing a substrate with a continuous, adherent surface layer of carrier material for catalytic material by providing on the substrate a layer of carrier material, at least part of which comprises a gel, and firing; and
  ii. sputtering catalytic material onto the surface layer by bombarding a source of the catalytic material in the neighbourhood of the surface layer with energetic ions, the conditions of atmosphere and selectivity of ions permitted to bombard the catalytic material being such that co-deposition upon the surface layer of unwanted material is avoided.

By energetic ions is meant ions having sufficient energy to cause useful sputtering of the source material. Impurities deposited upon the substrate from the atmosphere in which the sputtering is carried out, or impurities arising from deposition of the bombarding ions themselves upon the substrate, may render the catalyst inactive or diminish its activity. On the other hand, some impurities deposited in this way may be tolerated. We therefore propose that the conditions of atmosphere and selectivity of ions permitted to bombard the source material are carefully controlled to avoid impairing the activity of the product catalyst. Thus, by unwanted material is meant material which, in the quantity co-deposited in practice of the method of the invention, unacceptably impairs the catalytic activity of the product.

Particularly good control of the process is obtained if the ions are provided by an ion beam from an accelerator, ion separator or an ion gun. In these circumstances we have found it necessary for the "atmosphere" to be a vacuum such that the mean free path of both ions and sputtered atoms is sufficient for efficient transfer and deposition of the sputtered atoms. Thus the vacuum should be of the order of or better than $10^{-2}$ to $10^{-3}$ Torr. Thus, in a preferred method according to the invention, the source material and substrate are mounted in a vacuum system and the source material is sputtered onto the substrate by bombarding the source material with a beam of ions from an accelerator or ion beam separator or an ion gun.

As is well known in the art, it is possible to produce ion beams containing a particular selected ion to a high degree of purity. Although high purity is not necessarily essential, it is necessary that the ion beam will not result in contamination of the deposited catalyst. Consequently, in the method of the present invention, it is preferred to use a beam of inert gas ions such as Neon, Argon, Krypton, Xenon. Argon is preferred because it provides a good sputtering yield and is relatively inexpensive.

The present invention further provides a catalyst comprising a substrate carrying a continuous, adherent surface layer of carrier material, which surface layer is obtainable by providing on the substrate a layer of carrier material, at least part of which comprises a gel, and firing, said surface layer being compatible with and supporting a coating of catalytic material, a major proportion of the coating comprising an unagglomerated atomic dispersion.

We prefer that the coating comprises a monatomic layer, which we particularly prefer to comprise a layer of sputtered material.

We have found that, in tests on the catalysts of the present invention, there was very little degradation of the catalytic material following repeated thermal cycling and less degradation than in the case of a catalytic material supported by a support lacking the continuous, adherent surface layer.

The surface layer is preferably an electrically insulating layer, for example, of a refractory oxide such as alumina, ceria, yttria, zirconia and titania. We particularly prefer, however, that the surface layer comprises alumina, which may be substantially pure or which may contain additional ingredients, such as yttria, for stabilising the alumina.

The substrate may consist wholly of non-metallic material, for example of an aluminosilicate such as fibrous kaolin or a ceramic such as silicon carbide.

We prefer, however, that the substrate comprises an aluminium bearing ferritic alloy. Such an alloy may be used either oxidised or unoxidised. When oxidised, for example, by heating in air, the alloy has the property of forming an alumina layer which protects the alloy against further oxidation and is also self-healing on heating in air.

We particularly prefer that the aluminium bearing ferritic alloy is an alloy of iron, chromium, aluminium and yttrium with proportions by weight lying in the range up to 15% chromium, 0.5 to 12% aluminium, 0.1 to 3% yttrium, and the balance iron. This specific alloy is extremely ductile at elevated temperatures so that its resistance to shock and fracture under severe thermal cycling makes the material mechanically acceptable for use in treatment of effluent, such as car exhaust fumes. It is also suitable for use in carbon dioxide and steam.

The above mentioned oxidised aluminium bearing ferritic alloy may, if desired, by provided with cracks in the alumina layer thereof. Such cracks may provide a "key" to assist adhesion of the carrier material and they may, for example, be formed by subjecting the oxidised alloy to mechanical work such as by bending, forming, corrugating, knurling, myhening, grinding, impacting or stretching.

The success of the catalysts of the present invention where the substrate is an aluminium bearing ferritic alloy, is believed to be due to the firing step causing formation of an oxide surface on the alloy which grows into and binds with the carrier material, thereby improving adhesion of the carrier material to the substrate.

The catalytic material used in the present invention is preferably a platinum group metal, namely, ruthenium, rhodium, palladium, osmium, indium or platinum, or an alloy of two or more platinum group metals. We particularly prefer that the catalytic material is platinum.

The layer of carrier material is preferably provided on the substrate by the technique of wash-coating, wherein, for example, the substrate is contacted with an aqueous dispersion of a water-dispersible gel of the carrier material followed by drying. Thus, the dispersion is an aquasol and the drying converts the sol into the gel form. The subsequent firing step then converts the gel into a continuous, adherent layer of the carrier material. We prefer that the dispersion contains crystallites of diameter in the range from 3 nm to 100 nm, and we particularly prefer that such crystallites have a diameter of 10 nm.

We have found that, when an aqueous dispersion of a water-dispersible gel is used, its concentration is very important. Thus, when using an aqueous dispersion of alumina gel, we have obtained our best results at a concentration in the range equivalent to 1 g of alumina per 1.0 ml of water to 15 g of alumina per 100 ml of water and most particularly at a concentration equivalent to 5 g of alumina per 100 ml of water. If the concentration is low, for example, 0.5 g $Al_2O_3$/100 ml water, it may not be possible to obtain a continuous surface layer and significant thermal degradation may occur in the above mentioned thermal cycling tests. If the concentration is high, for example, 20 to 50 g $Al_2O_3$/100 ml water, the surface layer may crack because of its thickness.

The dispersion may contain further ingredients to assist even application of gel onto the substrate. For example, the dispersion may contain a wetting agent and/or a binder. Examples of wetting agents which may be used are ethylene oxide condensates such as "Nonidet P40" which is an octylphenol ethylene oxide condensate, and "Tergitol NPX" which is an alkyl phenol ether of polyethylene glycol. Examples of binders which may be used are polyvinyl alcohol and water soluble cellulose ethers.

In the above mentioned wash coating technique, the dispersion may additionally contain dispersed therein carrier material powder of a larger particle size than that of the dispersed gel. For example, when the carrier material is alumina, the dispersion may contain dispersed therein alumina gel and a high surface area alumina powder. The ratio of alumina powder to alumina gel may be in the range 6:1 to 10:1 by weight, for example, in the ratio of 8:1 by weight.

The powder is for providing an extension of surface area and where the carrier material is alumina, it is desirably of $\gamma$-alumina having a surface area of the order of 200 m²/g. However, if a lower surface area is acceptable, the powder may comprise $\alpha$-alumina powder of average particle size in the range 1 to 5 microns or $\gamma$-alumina spherical particle of diameter in the range 1 to 15 microns, although it should be noted that dispersion becomes more difficult with powder of particle size greater than about 10 microns.

For satisfactory operation of a catalyst of the present invention, we have found that it is important that the firing step should be carried out at a temperature at least as high as that to which the catalyst will be subjected in use. Such a temperature may, for example, be not less than 1100°C.

The present invention still further provides a catalyst system for treatment of exhaust gases in an internal combustion engine comprising a catalyst chamber, means for supplying air and exhaust gases to the chamber, and a catalyst, according to the present invention, mounted in the chamber.

The invention will now be particularly described in the following examples, where reference will be made to the drawing accompanying the Provisional Specification, in which:

FIG. 1 is a diagrammatic sectional view of a catalyst system for car exhaust treatment.

EXAMPLE 1

A plane sheet of "Fecralloy" (Trade Mark) aluminium bearing ferritic alloy comprising 15% Cr, 4% Al, 0.3% Y and remainder Fe 2 inches wide and 0.0025 inches thick was heated in air about 1000°C for about 24 hours in order to form an alumina layer. After cooling, the sheet was corrugated slightly and dipped into an alumina sol (containing crystallites of dimensions Ca 100 A) which had been prepared by adding 5 g of a dispersible gel of hydrous alumina (containing 75% by weight $Al_2O_3$) to 100 ml of deionised water. The sheet was removed from the sol, drained and allowed to dry slowly overnight. The sheet was then placed in an air furnace and the temperature raised gradually at a rate of about 300°C/hour to 1100°C where it was held for 4 hours in order to fire the sheet. Platinum was then deposited upon the sheet by sputtering from a platinum target using an argon ion beam to produce a catalyst, having a loading of catalytic material, i.e., platinum, of 22 micrograms per square centimeter.

The catalyst was then tested as follows. The sheet was rolled into a cylinder of 2 inches length and 1 inch diameter and tested in the exhaust system of a 4-stroke internal combustion engine as shown in FIG. 1. Two catalyst cylinders 11 are employed.

Exhaust gas leaving the engine manifold enters at 12 and contacts the first catalyst cylinder under reducing conditions in which oxides of nitrogen are catalytically reduced to nitrogen and oxygen.

To oxidise carbon monoxide it is necessary to introduce oxygen and this is achieved, in this example, by a pumped supply of air into pipeline 13. The exhaust gases thus contact the second catalyst cylinder under oxidising conditions in which carbon monoxide is catalytically oxidised to carbon dioxide.

The catalyst was subjected to displacement in excess of 100,000 displacements per hour for 60 hours. During this time, the catalyst exhibited greater than 98% conversion of the carbon monoxide effluent of the engine to carbon dioxide. At the end of the test, the total platinum loading was found to have remained unaltered.

It should be noted that we have generally found the firing temperature of 1100°C to be most satisfactory. If the firing temperature is below this, then the final catalyst may suffer some loss of efficiency on thermal cycling.

EXAMPLE 2

The procedure of Example 1 was repeated using an unoxidised sheet of the "Fecralloy" (Trade Mark) aluminum bearing ferritic alloy and using 45 ml of the aquasol additionally containing 20 drops of a 1% solution of BDH Nonidet P40 wetting agent (polyvinyl alcohol), and 7 ml of a 2.5% solution of MOVIOL N 85-88 binder (an octyl phenol ethylene oxide condensate).

The final catalyst was also found to be satisfactory in the test procedure.

We claim:
1. A method of preparing a catalyst which comprises the steps of
   i. contacting a substrate with a sol of a refractory carrier material, drying to convert the sol to a gel, and firing, thereby to provide the substrate with a continuous adherent surface layer of the carrier material; and
   ii. sputtering catalytic material onto the surface layer.
2. A method according to claim 1 wherein the refractory carrier material is a refractory oxide.
3. A method according to claim 2 wherein the sol contains crystallites of diameter in the range from 3 nm to 100 nm.
4. A method according to claim 3 wherein the diameter of the crystallites is 10 nm.
5. A method according to claim 2 wherein the refractory oxide is alumina and the concentration of the sol is in the range equivalent to 1 g of alumina per 100 ml of water to 15 g of alumina per 100 ml of water.
6. A method according to claim 5 wherein the concentration of the sol is equivalent to 5 g of alumina per 100 ml of water.
7. A method according to claim 2 wherein the substrate comprises an aluminium-bearing ferritic alloy.
8. A method according to claim 7 wherein the aluminium bearing ferritic alloy comprises an alloy of iron, chromium, aluminium and yttrium with proportions by weight lying in the range up to 15% chromium, 0.5 to 12% aluminium, 0.1 to 3% yttrium, and the balance iron.
9. A method according to claim 7 wherein the catalytic material is a platinum group metal or an alloy of two or more platinum group metals.
10. A method according to claim 9 wherein the catalytic material is platinum.
11. A method of preparing a catalyst support which comprises contacting a substrate comprising an aluminum-bearing ferritic alloy with a sol of a refractory carrier material for catalytic material, drying to convert the sol to a gel, and firing, thereby to provide the substrate with a continuous, adherent surface layer of the carrier material.
12. A method according to claim 11 wherein the alloy has been oxidized to form an essentially alumina layer on the surface thereof.
13. A method according to claim 11 wherein the alloy comprises an alloy of iron, chromium, aluminium and yttrium with proportions by weight lying in the range up to 15% Cr, 0.5 to 12% Al, 0.1 to 3% Y, and the balance Fe.
14. A method according to claim 11 wherein the refractory carrier material is a refractory oxide.
15. A method according to claim 14 wherein the refractory oxide is alumina.
16. A method according to claim 15 wherein the refractory oxide comprises alumina in combination with yttria.
17. A method according to claim 11 wherein the dispersion contains crystallites of diameter in the range from 3 nm to 100 nm.
18. A method according to claim 15 wherein the concentration of the sol is in the range equivalent to 1 g of alumina per 100 ml of water to 15 g of alumina per 100 ml of water.
19. A method according to claim 11 wherein the firing takes place at a temperature of not less than 1100°C.

* * * * *